(12) United States Patent
Reichert et al.

(10) Patent No.: US 7,468,833 B2
(45) Date of Patent: *Dec. 23, 2008

(54) ERGONOMIC MICROSCOPE AND MICROSCOPE CARRIER

(75) Inventors: Werner Franz Reichert, Bad Nauheim (DE); Gerhard Pfeifer, Solms (DE); Manfred Gilbert, Schoeffengrund (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/543,436

(22) Filed: Oct. 5, 2006

(65) Prior Publication Data

US 2007/0081230 A1 Apr. 12, 2007

Related U.S. Application Data

(63) Continuation of application No. 10/765,433, filed on Jan. 27, 2004, now Pat. No. 7,136,222.

(30) Foreign Application Priority Data

Feb. 8, 2003 (DE) ................................ 103 05 195

(51) Int. Cl.
*G02B 21/00* (2006.01)
*B43L 15/00* (2006.01)

(52) U.S. Cl. ..................................... 359/368; 248/118.3
(58) Field of Classification Search ................. 359/368, 359/391; 248/118, 118.3
See application file for complete search history.

(56) References Cited

U.S. PATENT DOCUMENTS

| 5,195,705 | A | * | 3/1993 | Kline et al. | ............... 248/118.3 |
| 5,572,360 | A | * | 11/1996 | Gaul | ........................... 359/390 |
| 6,690,512 | B2 | * | 2/2004 | Konopa | ....................... 359/391 |
| 6,717,724 | B2 | * | 4/2004 | Mitzkus et al. | ............. 359/368 |

* cited by examiner

*Primary Examiner*—Alessandro Amari
(74) *Attorney, Agent, or Firm*—Simpson & Simpson, PLLC (57) ABSTRACT

An ergonomic microscope (1) and a microscope carrier (2) are disclosed. The microscope encompasses a stand (3) which possesses a stand base (3a) that defines an external contour (3b). The microscope (1) is placed onto the microscope carrier (2). The microscope carrier (2) comprises a body (4) and a left and a right hand rest (6). The left and the right hand rest (6) are attached to the body (4) so as to pivot freely and independently of one another. A height adjustment of the microscope carrier (2) results in a pivoting of the hand rests (6) in such a way that their front edges (6a) rest on the bench surface (50) regardless of the height adjustment.

13 Claims, 6 Drawing Sheets

ERGONOMIC MICROSCOPE AND MICROSCOPE CARRIER

CROSS REFERENCE TO RELATED APPLICATIONS

This application is a continuation of application Ser. No. 10/765,433, filed Jan. 27, 2004 now U.S. Pat. No. 7,136,222, which in-turn claims priority from German application 103 05 195.3-42. which is incorporated by reference herein.

FIELD OF THE INVENTION

The invention concerns an ergonomic microscope and the invention further concerns a microscope carrier.

BACKGROUND OF THE INVENTION

German Patent 101 48 781, corresponding to U.S. Pat. No. 6,717,724 discloses a microscope carrier with which the microscope can be brought into an ergonomic position for the user. A base plate with adjustable tilt simultaneously also serves as an armrest. In the center of the base plate, a support plate that adjusts the microscope in terms of height and tilt is provided for the microscope and also connected to it. Because the base plate and carrier plate are connected, a plurality of adjustment steps are needed in order to establish the ergonomically most favorable position. In addition, the base plate occupies a large installation space, which is detrimental to closely-packed utilization of laboratory benches.

U.S. Pat. No. 5,517,354 describes an ergonomically adjustable carrier plate for a microscope. The microscope is mounted immovably on said carrier plate. At least one threaded foot is necessary in order to adjust the tilt of the carrier plate. Handrests for the user are not provided, so that when a microscope has been adjusted in terms of height, a user must adopt an extremely unfavorable hand position.

U.S. Pat. No. 5,195,705 describes a microscope stand that is adjustable in terms of height. Armrests can be added to the stand in order to achieve an ergonomic working position. The armrests possess only one fixed height, so that an optimally ergonomic working position is in fact achieved only for one set height of the microscope.

U.S. Pat. No. 2,730,923 describes a microscope that can be tilted, together with the illumination device, in order to achieve an ergonomically favorable working position for the user. No handrests exist. Tilting of the microscope, and thus also of the microscope stage, is not suitable for many microscopic experiments.

The apparatuses described in the aforesaid patents do not meet the criterion of allowing an ergonomic position of a microscope to be easily established. Furthermore, the means for attaining the ergonomic position should occupy minimal space on an installation surface.

SUMMARY OF THE INVENTION

The object of the invention is to create an ergonomic microscope that can be brought, depending on the user's desires, into a position that is ergonomic for him or her. The intention is to make possible for the user an ergonomic hand position or hand posture for operating the microscope.

The aforesaid object is achieved by an ergonomic microscope which comprises: a microscope carrier and a stand positioned on said microscope carrier; a left and a right hand rest are pivotally mounted to the microscope carrier and the left and the right hand rest are pivot freely and independently of one another.

A further object of the invention is to create a microscope carrier that is suitable for modifying the position of a microscope and that makes possible, for a user, an ergonomic hand position or hand posture for operating the microscope.

The above object is achieved by a microscope carrier which comprises a body, a left and a right hand rest attached to the body so as to pivot freely and independently of one another.

The invention has the advantage that, regardless of the adjustment of the microscope carrier, the handrests mounted pivotably on it always rest with one side on the bench surface. The left and right handrests are attached to the body so as to pivot freely and independently of one another. The body furthermore possesses an external contour that corresponds substantially to the external contour of the stand base of the microscope. This is particularly advantageous in terms of ergonomics, since no steps or edges occur at the transition between microscope carrier and microscope. The result is optimum accessibility of the microscope's operating elements. It is further advantageous that the handrests each have a front edge, and that the handrests taper from a certain segment toward the front edge. A smooth transition for the user's hands from the bench surface to the handrests is thereby created. The user does not need to bring his or her hands into an unaccustomed and ergonomically unfavorable position in order to actuate the operating elements on the microscope.

Further advantageous embodiments of the invention are evident from the dependent claims.

BRIEF DESCRIPTION OF THE DRAWINGS

The subject matter of the invention is depicted schematically in the drawings and will be described below with reference to the Figures, in which.

DETAILED DESCRIPTION OF THE INVETION

Figure 1:
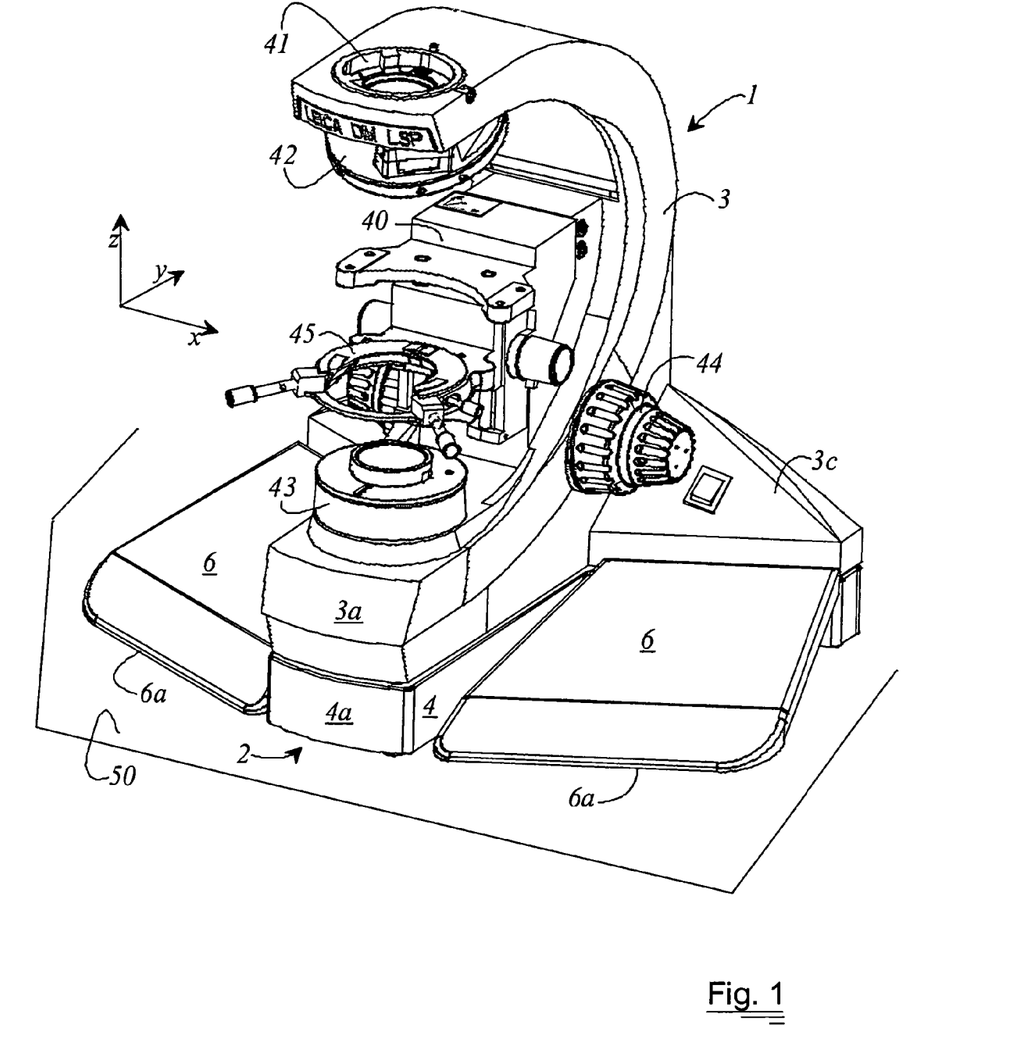
FIG. 1 is a perspective view of a microscope on the ergonomic microscope carrier according to the present invention.

FIG. 1 shows a microscope 1 that is placed on a microscope carrier 2. Elements of the microscope such as, for example, the X/Y stage, objective turret, eyepieces, etc. are omitted in order to eliminate negative influence on the clarity of the drawing. FIG. 1 discloses only one type of microscope, but it is self-evident that all other types of microscopes are applicable in the context of this invention. Microscope 1 encompasses a stand 3 that serves as carrier for the various elements of microscope 1. Stand 3 possesses an attachment element 40 for the X/Y stage. In the upper region of the stand, an attachment opening 41 is provided for a tube or another port, for example a camera port. Directly below attachment opening 41, an installation element 42 for the objective turret is provided. Stand 3 stands on a stand base 3a that, has a different external contour 3b depending on the type of microscope (see FIG. 2). A coaxial adjustment knob 44 is provided respectively on the left and right of stand 3 for coarse and fine adjustment in the Z direction of attachment element 40 for the X/Y stage. Also provided on attachment element 40 for the X/Y stage is a mount 45 for a condenser or another optical means. A field diaphragm 43 is provided in the lower part of stand 3 that is located opposite stand base 3a. Stand 3 has respective support elements 3c protruding on the left and on the right, which also contribute to external contour 3b of stand base 3a. A further function of support elements 3c is to ensure sufficient stability for the entire microscope 1. As already mentioned above, microscope 1 can be placed onto a microscope carrier 2. Microscope carrier 2 comprises a body 4 on which movable handrests 6 can be attached. Microscope 1 together with microscope carrier 2 usually stands on a bench surface 50. Handrests 6 each have a front edge 6a. Handrests 6 are movable on microscope carrier 2 in such a way that regardless of adjustment, their front edges 6a rest on bench surface 50.

Figure 2:
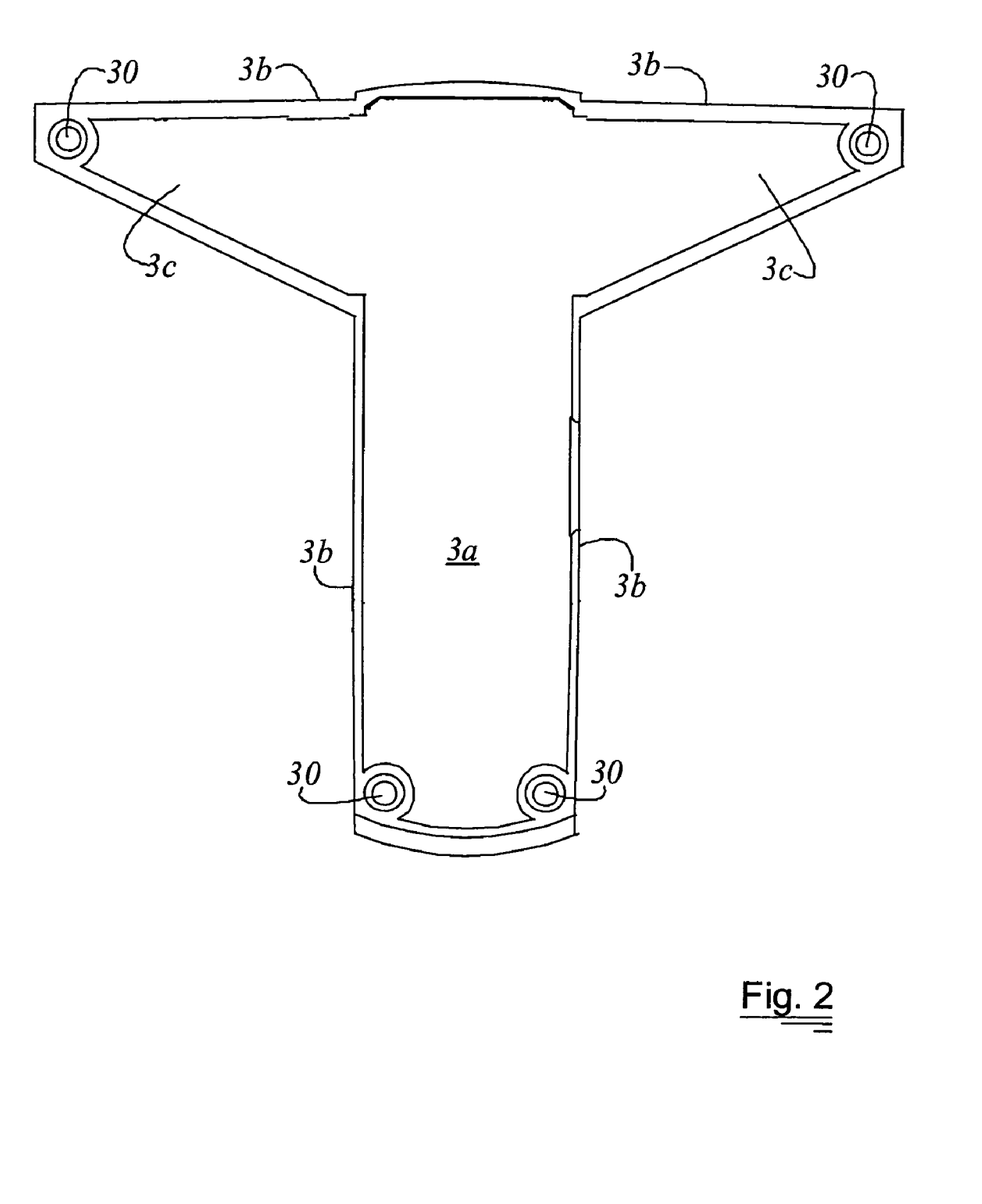
FIG. 2 is a bottom view of the microscope that is placed with the respective stand base onto the microscope carrier.

FIG. 2 is a bottom view of microscope 1 that is placed with its respective stand base 3a on microscope carrier 2. The stand possesses, on stand base 3a, several feet 30 that can also be embodied for vibration damping. As already mentioned in the description of FIG. 1, stand base 3a has an external contour 3b to whose shape the support elements 3c protruding from stand base 3a also contribute.

Figure 3:
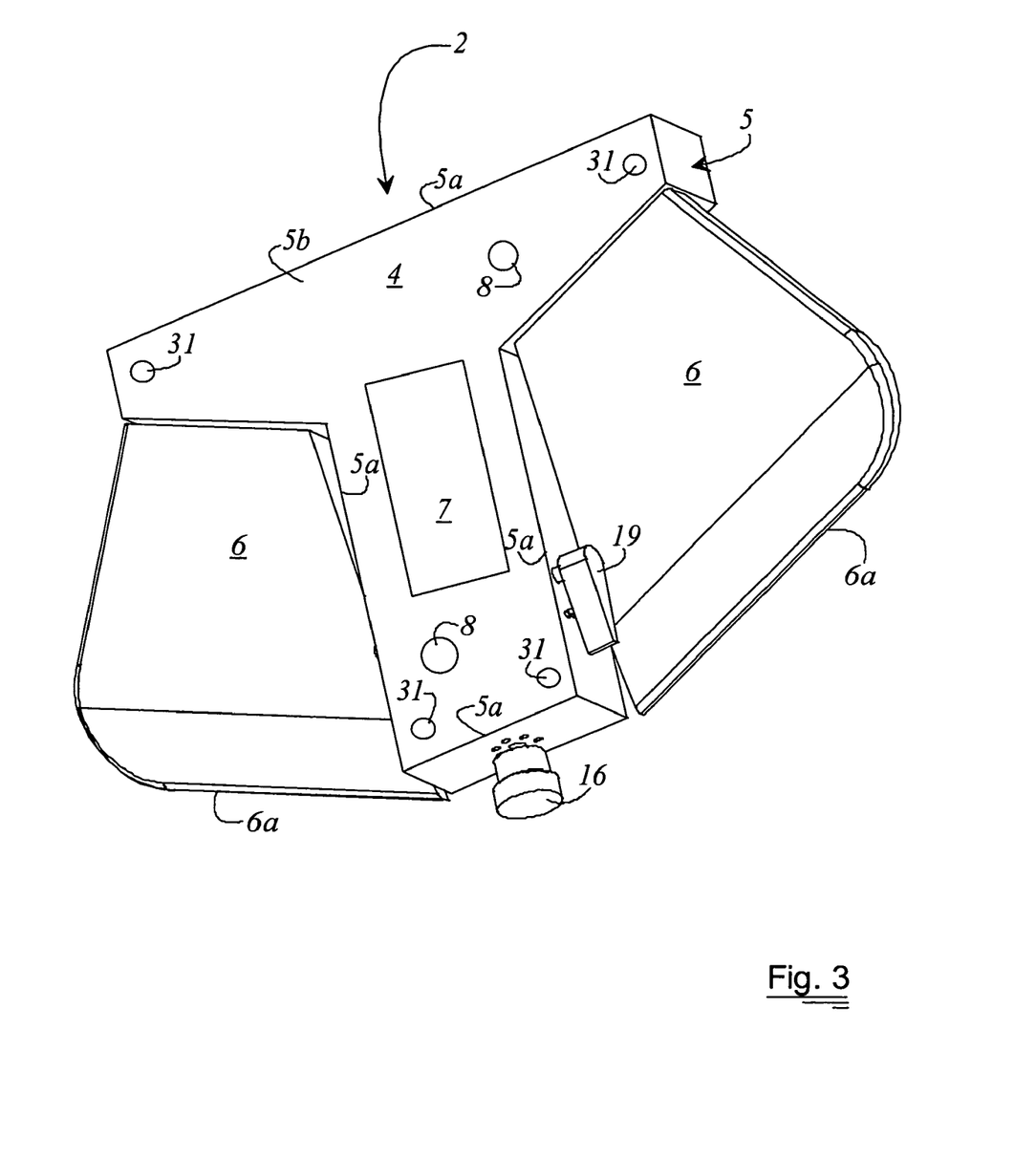
FIG. 3 is a perspective plan view of an embodiment of the microscope carrier according to the present invention.

FIG. 3 is a perspective depiction of an embodiment of microscope carrier 2 according to the present invention. Microscope carrier 2 comprises a body 4 on which handrests 6 can be movably attached. As is evident from FIG. 4, body 4 comprises a housing 5, open toward the bottom, which possesses an external contour 5a that corresponds to external contour 3b of stand base 3a of microscope 1. Housing 5 also has a surface 5b in which depressions 31 are present. Depressions 31 can also be embodied as cutouts or holes. The number of depressions 31 is based on feet 30 provided on the stand base of microscope 1. It is self-evident that a different arrangement of depressions 31 must be provided depending on the type of microscope. Feet 30 of microscope 1 are received into depressions 31 of housing 5, so that an orientation of microscope 1 on microscope carrier 2 is likewise attainable. In the embodiment depicted here, a cutout 7 is embodied on body 4. Through this cutout, provision can be made for ventilation or for conveying further connection elements to the microscope. Connection elements are, for example, cables, fibers, or optical inputs and outputs. Microscope 1 can be bolted onto body 4, e.g. by way of the at least one opening 8. For that purpose, the bolts (not depicted) engage through openings 8 into corresponding threaded bushings embodied on the microscope base.

Figure 4:
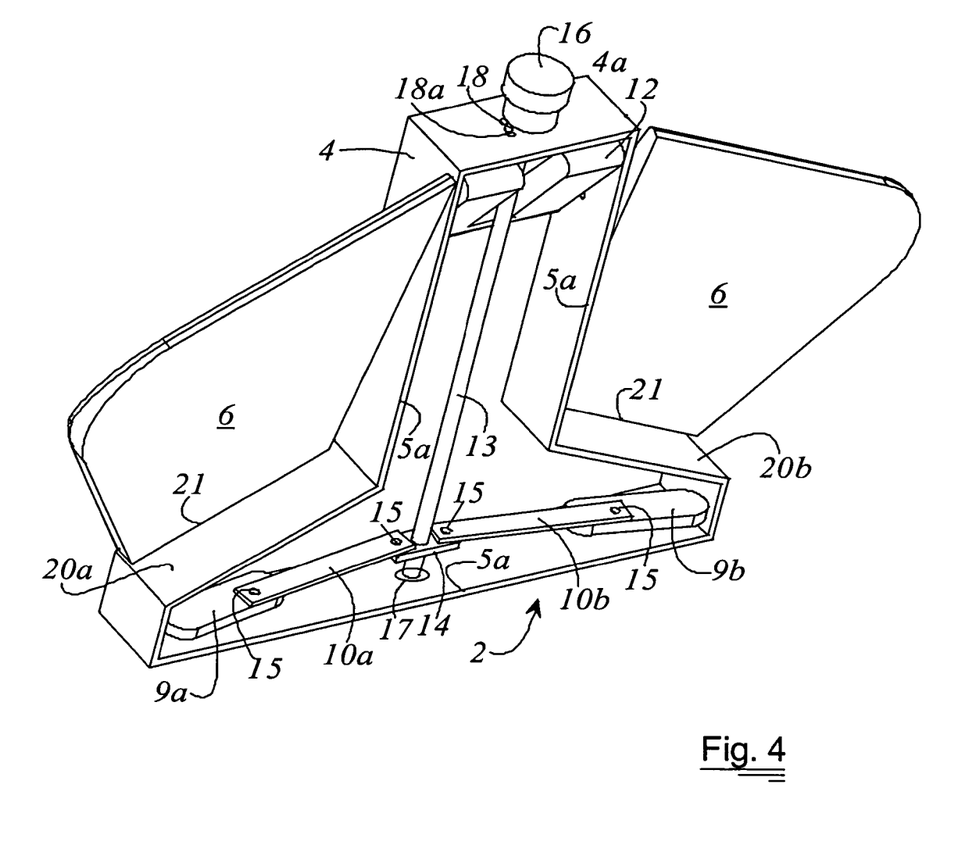
FIG. 4 is a perspective bottom view of an embodiment of the microscope carrier according to the present invention.

FIG. 4 depicts microscope carrier 2 in a perspective view from its underside. Provided in body 4, which is embodied as a housing 5 open toward bench surface 50, are a first and a second rear pivotable support 9a and 9b. In this embodiment, body 4 possesses substantially a T-shape that depends substantially on external contour 3b of stand base 3a. First and second rear pivotable supports 9a and 9b are mounted in the crossbar of the T-shape of body 4. A third pivotable support 12 is mounted in body 4 opposite first and second pivotable supports 9a and 9b. First, second, and third supports 9a, 9b and 12 are located opposite the region of the installation surface for microscope 1 which is equipped with feet 30.

First and second rear pivotable supports 9a and 9b are connected, each via a connecting bar 10a and 10b, to a bracket 14 mounted on a shaft 13. The connecting points between the bracket and first and second rear pivotable supports 9a and 9b are each embodied as a rotatable bearing pin 15.

Shaft 13 is arranged in rotatably and axially displaceable fashion in body 4. The axial displacement range is delimited by a stop disk 17 and an operating knob 16. Shaft 13 is impinged upon by a spring (not depicted) in such a way that operating knob 16 is constantly pressed against a front side 4a of body 4. Operating knob 16 possesses, in its side facing toward front side 4a of body 4, a detent lug 18 that snaps into corresponding detent flutes 18a arranged circularly about shaft 13 in front side 4a of body 4.

Third support 12, which is provided in the region of front side 4a of body 4 and fits around shaft 13 that is mounted rotatably and displaceably in body 4. Adjustment of third support 12 is accomplished via a lever 19 (see FIG. 3) that can also, similarly to operating knob 16, be snap-locked via detents.

The T-shaped crossbar of body 4 possesses a left and a right lateral cheekpiece 20a and 20b, on each of which a hinge system 21 is provided. Hinge system 21 serves to attach handrests 6. Each handrest 6 possesses a front edge 6a. Regardless of the height adjustment of microscope 1 by way of microscope carrier 2, handrests 6 attached via hinge system 21 rest with their front edges 6a on bench surface 50.

Figure 5:
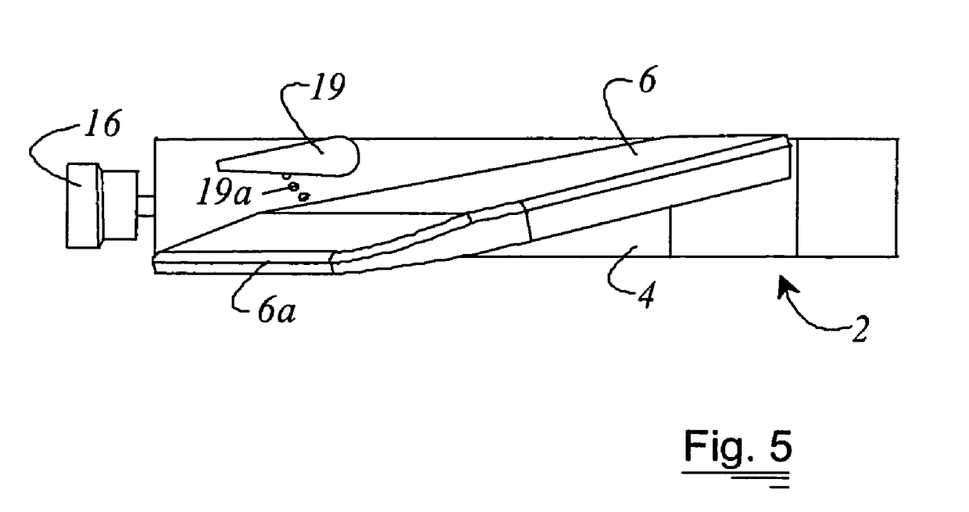
FIG. 5 is a side view of the microscope carrier according to the present invention.

FIG. 5 is a side view of microscope carrier 2 according to the present invention Operating knob 16 for first and second pivotable supports 9a and 9b (see FIG. 4 and FIG. 6) is provided on body 4. Lever 19 (see FIG. 3) is provided on body 4 for the adjustment of third support 12. Locking of lever 19 is likewise possible via detents 19a. It is also advantageous to arrange operating knob 16 and lever 19 on body 4 in such a way that operating knob 16 is mounted at the rear, and lever 19 at the front, of body 4. Handrests 6 can be attached to body 4 or to housing 5 of the body. Each handrest 6 possesses a front edge 6a. Handrests 6 taper from a certain segment 6b toward front edge 6a The taper toward front edge 6a makes possible an ergonomic positioning of the user's hands, since the transition from bench surface 50 to the handrests is configured as smoothly as possible. The user need not experience any unaccustomed twisting of his or her hands in order to reach adjustment knobs 44 of microscope 1. The surface of handrests 6 can be equipped, for example, with a soft material. In addition, handrests 6 can be configured heatably in order to adapt them to human body temperature. It would also be possible to attach to the surface of handrests 6 tear-off sheets that are torn off for each new user of the microscope, in order to create hygienically clean working conditions.

Figure 6:
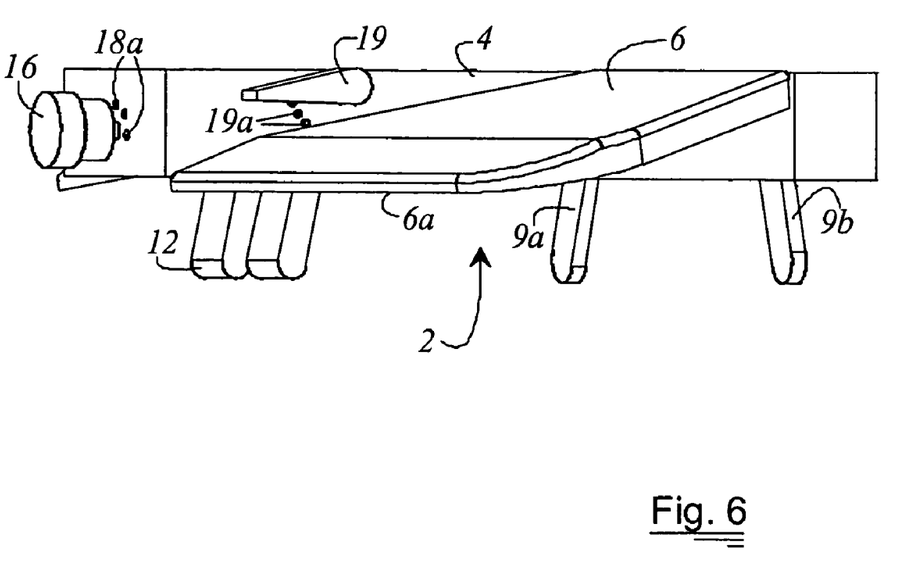
FIG. 6 is a side view of the microscope carrier according to the present invention in which the height adjustment has been performed.

In FIG. 6, the side view of FIG. 5 is modified in that height adjustment of microscope carrier 2 according to the present invention has been performed. Upon height adjustment of microscope carrier 2, first and second rear supports 9a and 9b pivot out of body 4 or out of housing 5 toward bench surface 50. Third pivotable support 12 also pivots out by actuation of lever 19. When first, second, and third supports 9a, 9b, and 12 are pivoted out in the same fashion, a height adjustment of microscope carrier 2 is achieved. Since first and second supports 9a and 9b can be actuated independently of the third support, a tilt of microscope carrier 2, and thus also of the microscope, with respect to the Z axis can be established. The tilt can be established toward the rear or toward the front. An adjustment by way of a spindle with nut, a scissor jack, a cam, separate shim elements, an adjustable-height clamp, or by bending or pivoting the supports on both sides, is also possible for implementing the height adjustment of microscope carrier 2.

What is claimed is:

1. An ergonomic microscope, which comprises a microscope in combination with a microscope carrier, said microscope carrier comprising a microscope carrier body, a left hand rest and a right hand rest, said microscope carrier body further comprising a left lateral cheekpiece and a right lateral cheekpiece, a hinge system for attaching said left hand rest and said right hand rest to said left lateral cheekpiece and said right lateral cheekpiece respectively, so the hand rests pivot freely and independently of one another.

2. The ergonomic microscope according to claim 1, wherein said microscope comprises a stand base defining an external contour, and said microscope carrier substantially with said external contour of said microscope carrier body.

3. The ergonomic microscope according to claim 2, comprising means for connecting said microscope and said microscope carrier together.

4. The ergonomic microscope according to claim 2, wherein said microscope carrier body comprises at least one depression for receiving at least one foot on the stand base of said microscope.

5. The ergonomic microscope according to claim 4, wherein said at least one depression is configured as a cutout or hole for orienting the microscope on said microscope carrier.

6. The ergonomic microscope according to claim 1, wherein said microscope carrier body comprises a housing open toward the bottom.

7. The ergonomic microscope according to claim 1, wherein said microscope carrier body of said microscope carrier comprises means for ventilation or supply.

8. The ergonomic microscope according to claim 1, wherein said microscope carrier comprises a plurality of pivotal supports that provide at least a three-point support of the microscope carrier on a bench surface.

9. An ergonomic microscope, which comprises a microscope and a microscope carrier therefor, said microscope carrier comprising a microscope carrier body, a left hand rest and a right hand rest, each of said hand rests having a front edge, said microscope carrier body further comprising a left lateral cheekpiece and a right lateral cheekpiece, a hinge system for attaching said left hand rest and said right hand rest to said left lateral cheekpiece and said right lateral cheekpiece respectively, so the hand rests pivot freely and independently of one another, said hand rests operatively arranged so that regardless of the adjustment said front edges rest on a bench surface.

10. The ergonomic microscope according to claim 9, wherein said microscope comprises a stand base defining an external contour, and said microscope carrier body defining an external contour, the external contour of said stand base corresponding substantially with said external contour of said microscope carrier body.

11. The ergonomic microscope according to claim 10, wherein said microscope carrier body comprises at least one depression for receiving at least one foot on the stand base of said microscope.

12. The ergonomic microscope according to claim 10, wherein said at least one depression is configured as a cutout or hole for orienting the microscope on said microscope carrier.

13. The ergonomic microscope according to claim 9, wherein said microscope carrier comprises a plurality of pivotal supports that provide at least a three-point support of the microscope carrier on a bench surface.

* * * * *

UNITED STATES PATENT AND TRADEMARK OFFICE
CERTIFICATE OF CORRECTION

| | |
|---|---|
| PATENT NO. | : 7,468,833 B2 |
| APPLICATION NO. | : 11/543436 |
| DATED | : December 23, 2008 |
| INVENTOR(S) | : Werner Franz Reichert et al. |

It is certified that error appears in the above-identified patent and that said Letters Patent is hereby corrected as shown below:

Column 5, line 11, cancel the text beginning with "2. The ergonomic microscope according to claim 1," to and ending "with said external contour of said microscope carrier body." in Column 5, line 14, and insert the following claim:

--2. The ergonomic microscope according to claim 1, wherein said microscope comprises a stand base defining an external contour, and said microscope carrier body defining an external contour, the external contour of said stand base corresponding substantially with said external contour of said microscope carrier body.--

Signed and Sealed this

Eighteenth Day of August, 2009

David J. Kappos
*Director of the United States Patent and Trademark Office*